US012001394B1

(12) United States Patent
Gassner et al.

(10) Patent No.: US 12,001,394 B1
(45) Date of Patent: Jun. 4, 2024

(54) USER PROGRAMMATIC INTERFACE FOR SUPPORTING DATA ACCESS CONTROL IN A DATABASE SYSTEM

(71) Applicant: Veeva Systems Inc., Pleasanton, CA (US)

(72) Inventors: Peter Gassner, Pleasanton, CA (US); Andrew Han, Needham, MA (US); Timothy S. Murphy, Berkeley, CA (US); Chatham Reed, New York, NY (US); Arno Sosna, Pleasanton, CA (US); Jon Stone, Manteca, CA (US); Igor Tsives, San Carlos, CA (US)

(73) Assignee: Veeva Systems Inc., Pleasanton, CA (US)

( * ) Notice: Subject to any disclaimer, the term of this patent is extended or adjusted under 35 U.S.C. 154(b) by 235 days.

(21) Appl. No.: 17/390,782

(22) Filed: Jul. 30, 2021

Related U.S. Application Data

(63) Continuation of application No. 16/752,448, filed on Jan. 24, 2020, now Pat. No. 11,256,661, and a continuation-in-part of application No. 15/811,470, filed on Nov. 13, 2017, now Pat. No. 10,796,013, and a continuation-in-part of application No. 15/674,416, filed on Aug. 10, 2017, now abandoned.

(51) Int. Cl.
*G06F 16/14* (2019.01)
*G06F 21/60* (2013.01)
*G06F 21/62* (2013.01)

(52) U.S. Cl.
CPC .......... *G06F 16/144* (2019.01); *G06F 16/148* (2019.01); *G06F 21/604* (2013.01); *G06F 21/6227* (2013.01)

(58) Field of Classification Search
None
See application file for complete search history.

(56) References Cited

U.S. PATENT DOCUMENTS

| | | | |
|---|---|---|---|
| 7,302,634 B2 * | 11/2007 | Lucovsky | ............... H04L 67/51 |
| | | | 709/217 |
| 7,860,903 B2 | 12/2010 | Shah et al. | |
| 8,001,087 B1 | 8/2011 | Newstadt et al. | |
| 8,161,157 B2 | 4/2012 | Tom et al. | |
| 9,092,137 B2 | 7/2015 | Gassner et al. | |

(Continued)

FOREIGN PATENT DOCUMENTS

EP    3579241 A1    12/2019

OTHER PUBLICATIONS

Aleksy, Using JDOSecure to Introduce Role-Based Permissions to Java Data Objects-based Applications, Sep. 2006.

(Continued)

*Primary Examiner* — Venkat Perungavoor

(57) ABSTRACT

Systems and methods for providing an API for a database system. The API may be provided to enable external application developers to build applications that can support the dynamic security model of the content management system and describe the runtime properties of records in data objects. The API of may provide a record property object and/or a query describe object when returning data set in response to a query by providing information about actions an end user can take on the data records, and to provide metadata required to understand a data response.

20 Claims, 11 Drawing Sheets

(56) References Cited

U.S. PATENT DOCUMENTS

| | | |
|---|---|---|
| 9,348,880 B1 | 5/2016 | Kramer et al. |
| 9,411,889 B2 | 8/2016 | Zhu et al. |
| 10,200,368 B2 | 2/2019 | Oberheide et al. |
| 2004/0225663 A1 | 11/2004 | Wayt et al. |
| 2005/0289111 A1 | 12/2005 | Tribble et al. |
| 2006/0206510 A1 | 9/2006 | Moulhaud et al. |
| 2007/0073688 A1 | 3/2007 | Fry |
| 2007/0088715 A1 | 4/2007 | Slackman et al. |
| 2007/0150447 A1 | 6/2007 | Shah et al. |
| 2008/0005287 A1 | 1/2008 | Harvey et al. |
| 2008/0147647 A1 | 6/2008 | Reeb |
| 2009/0287628 A1 | 11/2009 | Indeck et al. |
| 2010/0088317 A1 | 4/2010 | Bone et al. |
| 2011/0112970 A1 | 5/2011 | Yu |
| 2012/0150685 A1 | 6/2012 | Hinojosa et al. |
| 2012/0254090 A1 | 10/2012 | Burris et al. |
| 2012/0278786 A1 | 11/2012 | Ruiz et al. |
| 2013/0086039 A1 | 4/2013 | Salch et al. |
| 2013/0096937 A1 | 4/2013 | Campbell et al. |
| 2013/0117313 A1* | 5/2013 | Miao .................. G16H 40/20 707/E17.005 |
| 2013/0179955 A1 | 7/2013 | Bekker et al. |
| 2015/0220659 A1 | 8/2015 | Rissanen |
| 2015/0254456 A1 | 9/2015 | Jacquin |
| 2015/0363468 A1 | 12/2015 | Alvey et al. |
| 2016/0055307 A1 | 2/2016 | Macoviak et al. |
| 2016/0119380 A1 | 4/2016 | Gutesman et al. |
| 2016/0171226 A1* | 6/2016 | Wu .................. G06F 21/6209 707/608 |
| 2016/0255082 A1 | 9/2016 | Rathod |
| 2016/0359920 A1 | 12/2016 | Abuelsaad et al. |
| 2016/0366183 A1 | 12/2016 | Smith et al. |
| 2017/0337391 A1 | 11/2017 | Chang et al. |
| 2018/0234462 A1 | 8/2018 | Kruse et al. |
| 2019/0392068 A1 | 12/2019 | Wen et al. |

OTHER PUBLICATIONS

Asghar et al., Supporting Complex Queries and Access Policies for Multi-user Encrypted Databases, ACM. 2013.

Bartel et al., Static Analysis for Extracting Permission Checks of a Large Scale Framework—The Challenges and Solutions for Analyzing Android, IEEE Transactions of Software Engineering, Jun. 2014, vol. 40 No 6.

Sekar et al., Avoidance of Security Breach through Selective Permissions in Android Operating System, 2012, vol. 37 No. 12, ACM SIGSOFT Software Engineering Notes.

* cited by examiner

| Name | User | Role | Doc Type | Product | Country |
|---|---|---|---|---|---|
| DAC 001 | John Smith | Reviewer | Digital | Coldcap | USA |
| DAC 002 | Joan White | Owner | | Restalot | Canada |

FIG. 4

USER PROGRAMMATIC INTERFACE FOR SUPPORTING DATA ACCESS CONTROL IN A DATABASE SYSTEM

CROSS REFERENCE

The present application is a continuation application of U.S. nonprovisional patent application Ser. No. 16/752,448, filed on Jan. 24, 2020, entitled User Programmatic Interface for Supporting Data Access Control in a Database System, which is a continuation-in-part application of U.S. nonprovisional patent application Ser. No. 15/811,470, filed on Nov. 13, 2017, entitled User Programmatic Interface for Supporting Data Access Control in a Database System, and a continuation-in-part application of U.S. nonprovisional patent application Ser. No. 15/674,416, filed on Aug. 10, 2017, entitled System and Method for Online Identity Management, claiming priority to provisional patent application No. 62/452,899, filed on Jan. 31, 2017, entitled System and Method for Identity Management, which are hereby incorporated by reference herein for all purposes.

BACKGROUND

The subject technology relates generally to database management, and more particularly to an interface for supporting data record access control in database management systems.

Content management systems and other database management systems are widely used today. However, because of the large volume of documents in content management systems, large number of users, and their different permissions to access the documents, document access control has become more and more sophisticated. For example, some content management systems control user access to documents by their roles. Accordingly, it is desirable to provide a user interface so that developers, who build applications on a platform, e.g., a content management system, can make sure that their applications can access and display data in the content management system properly.

SUMMARY

The disclosed subject matter relates to a method for responding to a query in a database system. The method comprises: receiving record properties of a first data record and a second data record in the database system, wherein the record properties are defined dynamically based on application state. The method further comprises: receiving a first query for data objects in the database system; obtaining the first data record in response to the first query; obtaining record properties of the first data record; and displaying the first data record together with the record properties of the first data record on an interface.

BRIEF DESCRIPTION OF THE DRAWINGS

FIG. 4 illustrates an example user interface for receiving user setup records.

DETAILED DESCRIPTION

Figure 1:
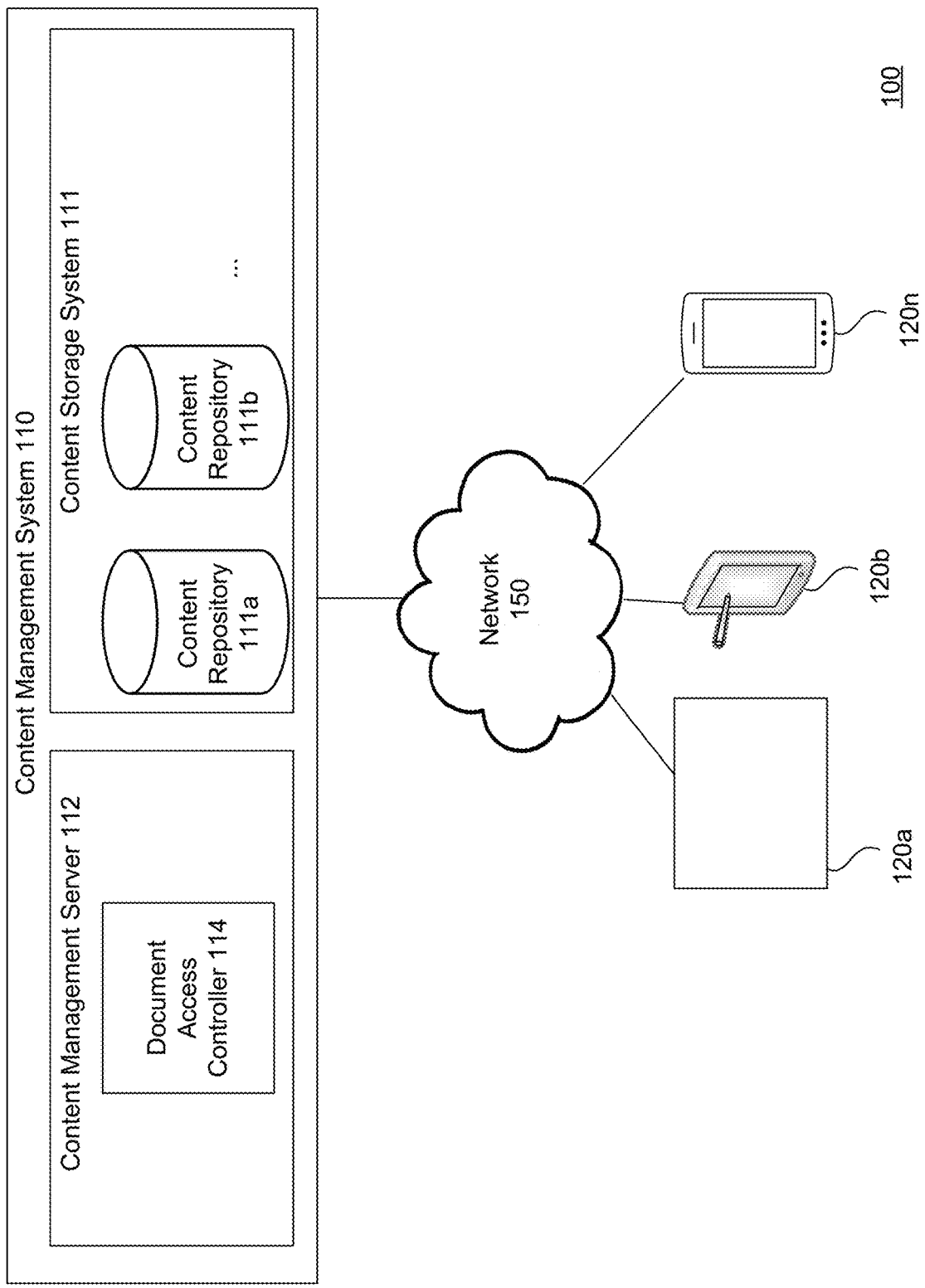
FIG. 1 illustrates an example high level block diagram of an enterprise content management architecture wherein the present invention may be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

In some content management systems, the permissions to access certain records and set of available actions on such records may be based on object states and user roles, and may be different for each record and user. This makes a static metadata describe application programming interface ("API") inadequate to accurately describe the record properties given user permissions. Understanding permissions, actions, and other properties of a record is critical for application development so that the application may present the correct behavior to the end user. For example, the application will need to be able to hide fields (or make fields visible), make fields read-only (or editable), validate user input and present a set of valid actions to the end user based on the configuration of the content management system and actions available to end user. The present invention enhances content management systems by providing a user interface to external application developers to enable them to build applications that can support the dynamic security model of the content management system and describe run-time properties of data object records.

Dynamic security may allow an administrator of a customer of the content management system to set up security rules, that may define not only access to a particular data record, but also access to a particular field within the data record, depending on a rule. With this type of granular security, when the content management system returns a set of records, it is desirable to provide information indicating what an end user can do with the data record (e.g., view, or edit). The user programmatic interface of the present invention may provide a record property object and/or a static query describe object when returning data set in response to a query to support the dynamic security by providing information about actions an end user can take on the data records, and to provide metadata required to understand a data response.

The present invention may be used in various development use cases. One example is external application built on a content management API (e.g., Veeva™ Align). The application, which runs externally (not in the content management process) but provides a user interface on the content management data, will require record properties, metadata, and CRUD to provide an acceptable user experience.

Some concepts of the present invention are defined below:

Configuration metadata. In the present invention, configuration metadata refers to the data that describes the configuration of the content management system. Configuration metadata is static and consistent across records and users. Relevant configuration metadata may include:
1. Permission Sets (Object and Object Field Permission),
2. Objects (Objects and Object Fields), and
3. State-Role field level security ("FLS") Rules.

Record properties. In the present invention, record properties refer to data that describes the run-time properties of an object record. The property values may be determined dynamically based on the application state, data, and configuration metadata. Property values will differ for each record and user.

Permission field level security ("FLS") in the present invention is FLS defined at the Permission Level.

State-Role FLS in the present invention is FLS defined based on Object state or the combination of object state and user role.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, . . . 120n, coupled to each other via a network 150. The content management system 110 may include a content storage system 111 and a content management server 112. The content storage system 111 may have one or more content repositories, e.g., 111a and 111b. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content storage system 111 may store content that user computing devices 120a-120n may access. Each content repository (e.g., 111a or 111b) may store a specific category of content, and allow users to interact with its content in a specific business context.

The content management server 112 is typically a remote computer system accessible over a remote or local network, such as the network 150. In one implementation, the content management server 112 may have a document access controller 114 which may control the process for setting up user roles, generating user groups, matching user groups and documents, and stamping user groups on matching documents.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
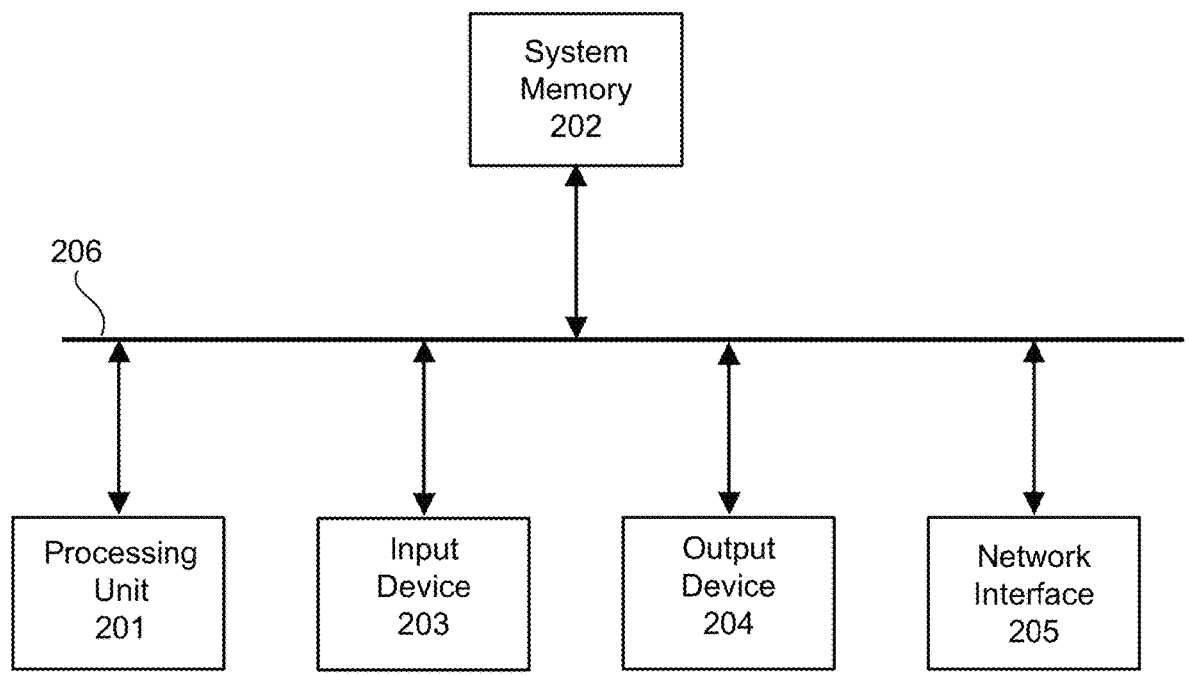
FIG. 2 illustrates an example high level block diagram of a computing device.

FIG. 2 illustrates an example block diagram of a computing device 200 which can be used as the user computing devices 120a-120n, and the content management server 112 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 304 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
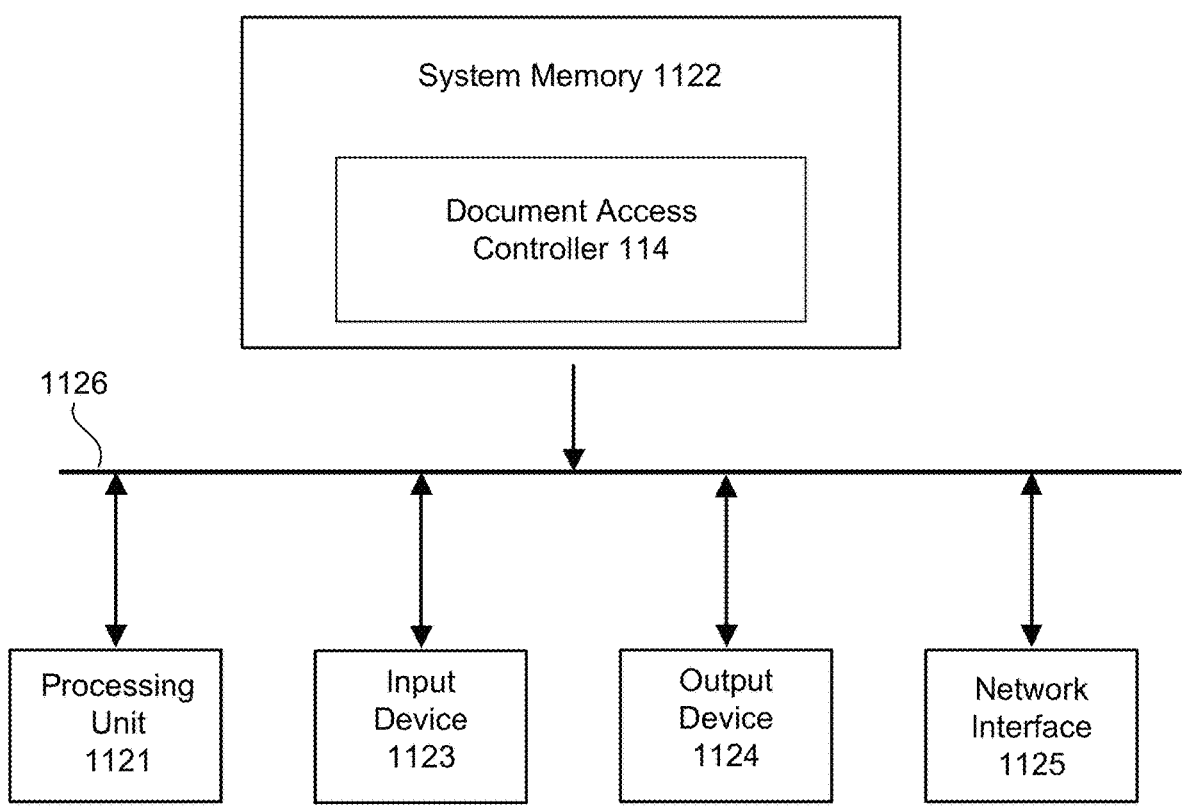
FIG. 3 illustrates an example high level block diagram of the content management server according to one embodiment of the present invention.

FIG. 3 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The document access controller 114 may be stored in the system memory 1122.

An enterprise may subscribe the content management service as a customer. End users may play different roles when accessing documents, e.g., owner and reviewer. In one implementation, end user setup records may be used to define the roles. As shown in FIG. 4, the end user setup records may be included in a table, and each end user setup record may have one or more fields. The fields may define the end user's access permissions based on his/her responsibilities and/or skillsets, and may include role, product, country, document type and other attributes.

A customer's system administrator may define what role(s) an end user may play, assign end users, or employees, different roles, and manage the roles with the end user setup records. A system administrator may use attributes in fields of the user setup records to group users depending on its business need. The system administrator may select default fields and/or attributes provided by the content management system 110, or add new fields and/or attributes to customize user roles. In one example, one user setup record may define a user as a reviewer, who is familiar with a product Coldcap and a country Canada. An end user's access to a data record in the content management system 110 may depend on the role assigned to him/her.

Figure 5A:
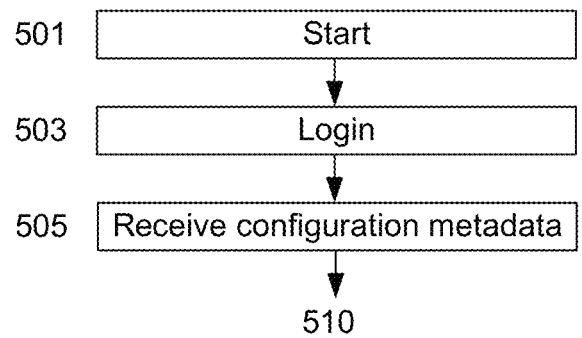
FIGS. 5A and 5B illustrate an example flowchart of a method for providing a user interface to support data access control in a content management system according to one embodiment of the present invention.
Figure 5B:
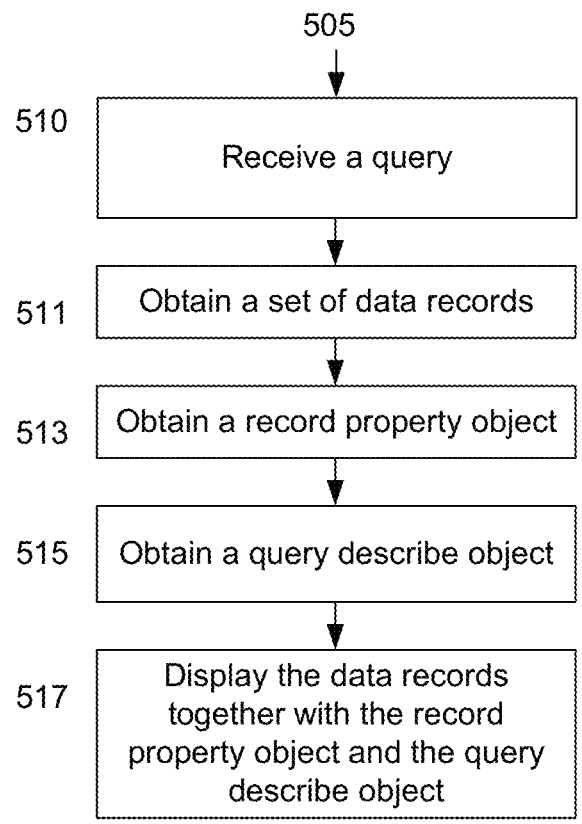

FIGS. 5A and 5B illustrate an example flowchart of a method for providing a user programmatic interface according to one embodiment of the present invention. The process may start at 501.

At 503, a system administrator may login to the content management system 110.

At 505, the content management system 110 may receive configuration metadata from the system administrator. The configuration metadata may provide information about each record that is coming back in a response, for example, if the user has certain permissions on the particular record (e.g., edit and delete), and if a particular record field is editable or hidden from the user.

A record property object describes the properties of a data record, and may include information on why a field is not displayed, e.g., hidden. For each record it may include:
1) Record id;
2) Record permissions—consistent with permission set actions (Read, Edit, and Delete); and
3) Record user actions—list of user actions available on this record with link to perform each action.

For requested fields on the record the response may include:
1) Edit—array of fields that are editable; and
2) Hidden—array of fields that are hidden.

One example of a record property object is as follows:
"id": "0VP000000000101
"permissions":
   "read": true,
   "edit": true,
   "delete": false
"field_properties":

"edit": ("component_name"),
"hidden": ("component_name", "component_type")

In one example, a record may have five fields. One field may be read-only to an end user. The way it is represented may be: it will not be shown in "edit", and not shown in "hidden". Return may include an array of fields that are editable, and an array of fields that are hidden.

A query may be received at 510.

At 511, a set of data records responsive to the query may be obtained from the content management system 110 and returned by the content management server 112.

At 513, a record property object may be generated for each data record in the set of data records and returned by the content management server 112.

To eliminate the complexity in understanding a query response, a query describe object may be generated by the content management server 112 and returned as part of the response to a query at 515, and may provide static metadata required to understand a data response. It may include:
1) Field name, Label
2) Data type
3) Max Length, Min/Max Values
4) Uniqueness
5) Status (Active, Inactive)

Examples of a couple of query describe objects are shown below:
"query_describe": {
  "name": "product_v",
  "label": "Product",
  "label_plural": "Products",
  "metadata": [
     {
     "label": "ID",
     "type": "ID",
     "required": false,
     "name": "id",
     "status": [
        "active_v"
        ]
     },
     {
     "label": "Product Name",
     "type": "String",
     "required": true,
     "unique": true,
     "name": "name_v",
     "status": [
        "active_v"
        ]
     "max_length": 128, In one example, when a response has four fields, the query describe object may provide metadata about each field and describe the shape of fields queried, including its name, its readable label, its datatype, and if it is a required field, unique field, a string, a number or a boolean. That metadata may apply to all records in the response, and provide information on how to process the response data.

Although the set of data records, record property objects, and query describe objects are shown to be obtained at 511, 513 and 515 separately in FIG. 5B, it should be appreciated that they can be obtained simultaneously.

At 517, the set of data records may be displayed together with the record property objects and the query describe objects on a user interface.

In one implementation, the query with properties pattern can be used by an external application which requires records and record properties for a set of records. This pattern will retrieve both with a single API call, reducing roundtrips. The response in this pattern contains both the "data" object and "record property" object as a pair of symmetric arrays.

In one implementation, the reporting component of the content management system may have the requirement to filter data on the client side of the query language. In order to support this functionality when the query comes from reporting, the response may include hidden data fields and a client, e.g., an external program, is required to perform the hiding on the client side.

In one implementation, an error may be returned when a field is requested but the end user does not have access to. In one implementation, fields may not be returned for any cell (row-field) that the user does not have access to.

The present invention may be applied to any data query and any system that returns a data set, e.g., SQL. For example, an API that returns records from a relational database, may return record properties.

The identity management system of the present invention improves the experience of the HCPs when accessing services offered by the life sciences industry, and serves the industry and information technology professionals by making it easier to interact with and offer services to HCPs by delivering a single sign-on service over web portals of multiple different service providers (e.g., pharmaceutical companies) for healthcare professionals.

Identity management of the present invention comprises the following:
1. HCP registration, for capturing basic information from the HCP to create a set of log-in credentials and a digital identity;
2. HCP verification, an optional, country-specific process to verify the HCP as a licensed or non-licensed HCP, to produce an exact match between the HCP and their digital identity, and to periodically re-verify the identity and license information;
3. Identity and authentication, authentication API, username/password management, and necessary API services required for third-party service authorization;
  Identifiers, single ID for the HCP across all HCP-facing services; and
  5. Authoritative HCP Data, leveraged for HCP verification, and ensuring license information is up to date.

Figure 6:
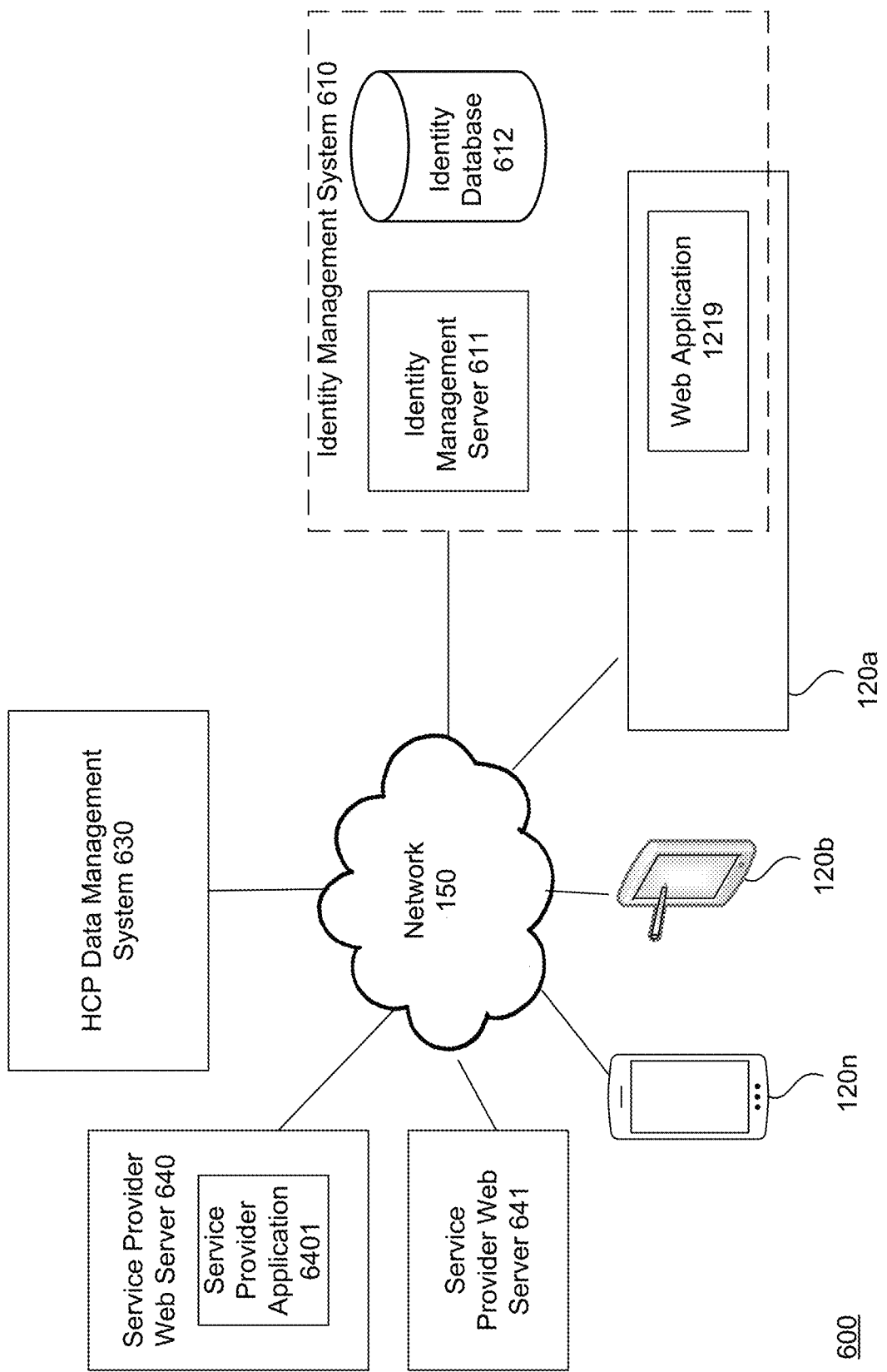
FIG. 6 illustrates an example high level block diagram of an identity management architecture wherein the present invention may be implemented.

FIG. 6 illustrates an example high level block diagram of an identity management architecture wherein the present invention may be implemented. As shown, the architecture 600 may include an identity management system 610, a plurality of user computing devices 120a, 120b, . . . 120n, an HCP data management system 630, and service provider web servers 640 and 641, coupled to each other via a network 150. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the service provider web servers 640 and 641 via the network 150, and may be any commercially available computing devices including laptop computers, desktop computers, mobile phones, smart phones, tablet computers, netbooks, and personal digital assistants (PDAs).

The first service provider web server 640 may host a first service provider website, and the second service provider web server 641 may host a second service provider website.

The identity management system 610 may have an identity management server 611 and an identity data storage device 612. The identity management server 611 is typically a remote computer system accessible over a remote or local network, such as the network 150. A web application (e.g., 1219) process may be active on one or more user computing devices (e.g., 120a), and the corresponding server process may be active on identity management server 611. The web application process and the corresponding server process may communicate with each other and with the HCP data management system 630 and the service provider web server 640 over the network 150, thus providing distributed functionality. The identity management server 611 may enable display of an identity management button on a webpage of the service provider website, and enable display of a user interface on a user computing device to allow an HCP user to register for the identity management service and provide profile information and login information. The identity management server 611 may communicate with the service provider web server 640 and the HCP data management system 630 to verity the HCP user and authenticate the HCP user to use the services provided by the service provider website.

The identity data storage device 612 may store data for identity management, including physician professional information (e.g., name, specialty, license information, affiliated health care organization ("HCO"), and contact information at the affiliated HCO), HCP profile information, login information and other information for verifying the HCP. It should be understood that the identity data storage device 612 may store data for other industries.

In one implementation, the identity data storage device 612 may be a relational database that masters the HCP's identity and related information such as verified email addresses and phone numbers, license information, and related external identifiers.

In one embodiment, the identity management system 610 may be a multi-tenant system where various elements of hardware and software of the system 610 may be shared by one or more customers, or service providers. For instance, a server may simultaneously process requests from a plurality of customers, and a database table may store rows for a plurality of customers.

In one embodiment, the identity management system 610 may be a cloud database which runs on a cloud computing platform.

The HCP data management system 630 may store verified HCP professional information. Each HCP may be an account in the HCP data management system 630.

The HCP data management system 630 may cleanse, standardize and/or de-duplicate data from different sources to form the single, consolidated HCP data and store the HCP data. This may help to avoid using multiple and potentially inconsistent versions of the same data. Any changes to the HCP data will be displayed on a data steward interface, so that a data steward may check the changes and update the customer master data when the changes are verified.

In one implementation, the HCP data management system 630 is a master data management system ("MDM"). The system 630 may store customer master data, which may be many types of data used by the enterprise, e.g., accounts, addresses and reference data. In one implementation, the system 630 may store verified HCP and/or healthcare organization ("HCO") information for a pharmaceutical company. In one example, the system 630 may store verified physician professional information of cardiologists in the U.S. compiled and/or purchased by a pharmaceutical company. Each HCP may be an account in the system 630. The system 630 may be implemented with any commercially available data storage devices.

In one implementation, the HCP data management system 630 is a relational database. It may be used both in the verification process to remotely proof (verify) users as HCPs and for periodic re-validation of HCPs that had previously been verified.

In one implementation, the HCP data management system 630 may be provided to the service providers by a data provider as a software as a service ("SaaS"). In addition, like the identity management system 610, the HCP data management system 630 may be a cloud based multi-tenant system.

The system memory 1202 in the user computing device 120a in FIG. 3 may store a mobile-ready web application 1219 that supports the following processes:

Sign-In. The user may enter their credentials to 'sign-in' or start the registration process on a sign-in page. Should the user successfully sign-in, this process will handoff an OpenID Connect ("OIDC") ID and access token to the service provider/relying party.

Registration. Process by which the user may create an identity within the identity data storage device 612. The identity may be an identity record identifying the user and comprise one main record and one or more related records. This can be done with without identity verification, i.e. the user can remain simply as a 'registered user' choosing not to elevate their identity to that of a verified HCP. A required part of this process is the capture and verification of a valid email inbox.

Verification. Process by which the user may verify that the identity within the identity data storage device 612 either as a medically licensed or non-medically licensed HCP. If the user chooses to go through this process, a license or national identifier may additionally be captured from the user based on the country in which he/she resides (also captured from the user). Using the last name and the appropriate identifier, the verification process will search for an exact match in the HCP data management system 630.

Client Authorization (OIDC/OAuth2). This authorization process entails checking each sign-in request made on behalf of a web-portal or mobile application (client application) to see if the user has authorized the client application to access their identity and related information. The identity may be used to enable these checks and maintain user-granted permissions for each client application attempting to access the user's identity.

The web application 1219 may enable self-service password reset, whereby a registered user can perform a self-service password reset via email, i.e. an email verification code is sent to the verified email inbox registered as a part of the user's identity.

The web application 1219 may support event tracking. Each sign-in, registration, verification, password reset process will generate an event record capturing all relevant information.

The web application 1219 may also enable customer-based customization, which may allow each customer to specify a customer logo that is displayed throughout each process facilitated by the identity management system 610, i.e. sign-in, registration, verification etc.

Figure 7:
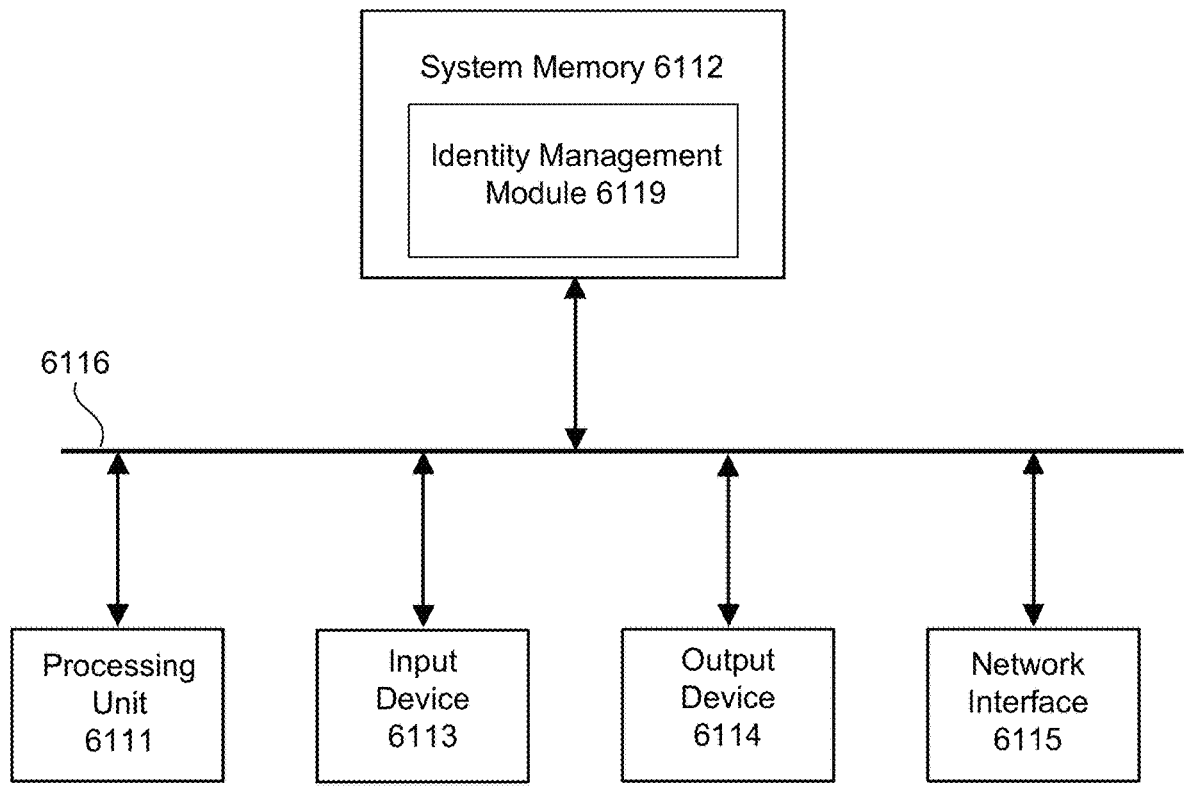
FIG. 7 illustrates an example high level block diagram of an identity management server according to one embodiment of the present invention.

FIG. 7 illustrates an example high level block diagram of the identity management server 611 according to one embodiment of the present invention. The identity management server 611 may be implemented by the computing device 200, and may have a processing unit 6111, a system memory 6112, an input device 6113, an output device 6114, and a network interface 6115, coupled to each other via a system bus 6116. The system memory 6112 may store the identity management module 6119, which controls the process to be discussed with reference to FIGS. 7-10.

The exchange of identity claims between the identity management system 610 (including the identity management server 611, the identity data storage device 612 and the web application 1219) and the service provider web server 640 may be facilitated with APIs, e.g., OpenId Connect 1.0 APIs. An Authorization Code Flow is a process in the OpenId Connect 1.0 specification that dictates how a service provider application 6401 in the service provider web server 140 can access identity claims about the user (http://openid.net/specs/openid-connect-core-1_0.html #CodeFlowAuth). An ID/Access Token Endpoint is an API endpoint used by the service provider application 6401 to ultimately retrieve ID and access tokens in the form of JSON Web Token (JWT). This endpoint conforms to the OpenId Connect specification and is used within the broader Authorization Code Flow process specification. A UserInfo Endpoint may be a standard endpoint that exposes additional information about the user stored in the HCP data management system 630. The access token may be used to access information from this endpoint, and the endpoint conforms to the OpenId Connect specification.

Figure 8:
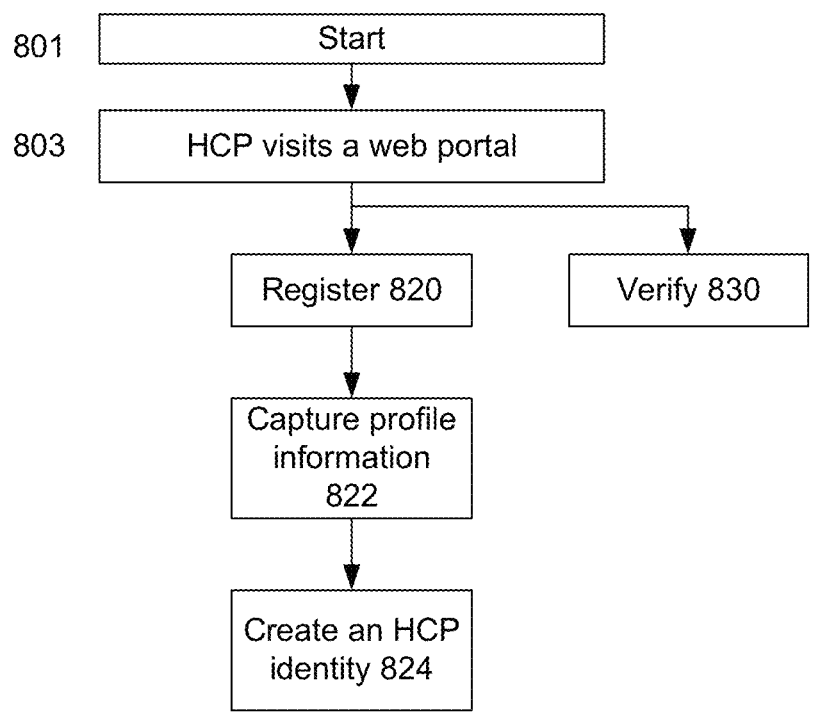
FIG. 8 illustrates an example flowchart of a method for HCP registration and verification according to one embodiment of the present invention.
Figure 9:
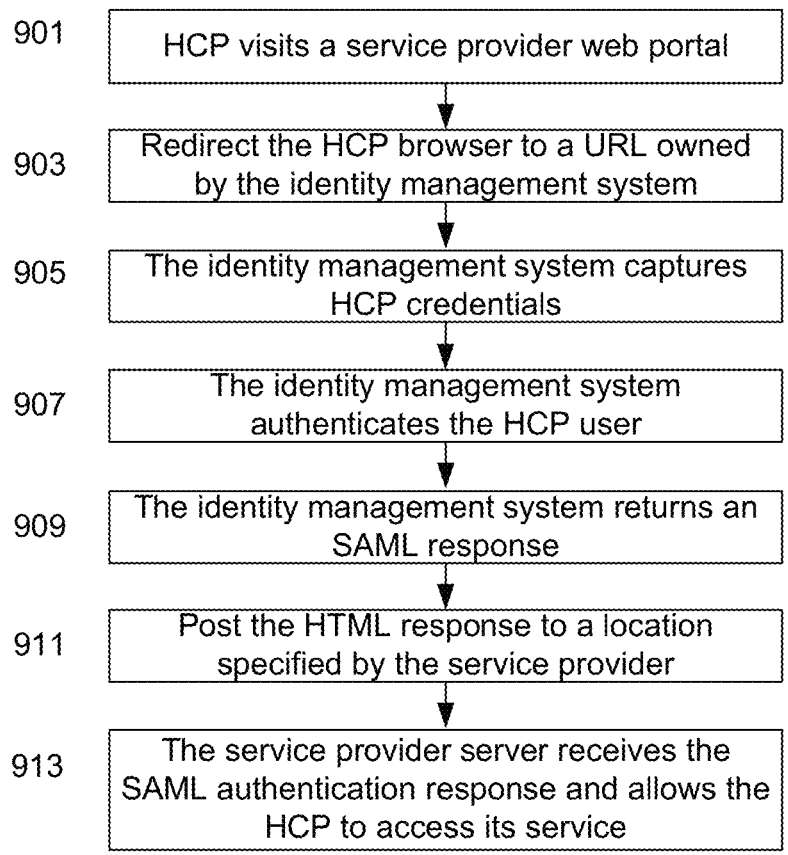
FIG. 9 illustrates an example flowchart of a method for HCP authentication according to one embodiment of the present invention.

The HCP interacts with the identity management system 610 by undergoing a registration process and creating login credentials. This action results in the creation of an identity in the identity data storage device 612. FIG. 8 illustrates an example flowchart of a method for user registration and verification according to one embodiment of the present invention. The process may start at 801.

At 803, an HCP may visit a service provider web-portal, e.g., Customer.com. This portal may host the Identity Sign-in Widget. The HCP may choose either to register only (820), or to register and verify (830). The end result of either of the two processes is the exchange of identity tokens/claims from the identity management system 610 to Customer.com (service provider/relying party).

If the HPC chooses to register with the identity management system 610, at 820, an 'unverified' record may be created within the identity data storage device 612 and establish credentials for the end user (HCP).

Required profile data may be captured and stored as a part of the HCP's identity during registration at 822. The profile data may include the HCP's first name, last name, email, user name, and password.

At the end of the HCP registration process, an HCP identity may be created in the identity data storage device 612 at 824. The HCP identity may be an identity record and an account, and have credentials.

The verification process follows the HCP Registration. The new user registration form may have an option for the HCP to undergo verification. If selected, the registration process starts HCP verification. Failure to complete the HCP verification process does not prevent creation of a valid HCP identity.

If the HPC chooses to register and verify, at 830, a verification check may be performed against the HCP data management system 630 after the HCP identity record is created in the identity data storage device 612. At the end of this process, credentials for the end user are established and the identity record reflects a 'verified' status, e.g. Dr. Smith has registered and is a medically licensed physician in the United States.

There are two main pieces of evidence used to verify an HCP: an address and license information. The system uses standardized codes for how the HCP identity has been verified.

The HCP has an option to go through a verification process classifying their identity according to one of two states:
1. Verified as Medically Licensed: HCP is registered, has verified identity, and has at least one valid medical license; and
2. Verified as Non-licensed: HCP is registered, has verified identity, but does not have at least one valid medical license.

The system may also capture details about the process used to verify the HCP. The system may capture what license (if it used) was used to verify the HCP, who or what process verified the HCP, and when the verification process was executed.

The verification process may be integrated directly into the registration process. Once an account is created, the HCP is offered the opportunity to verify himself. The system may capture the country in which the HCP is practicing, and support two options for HCP verification: verify as a licensed HCP via HCP-entered address and license information; or verify as a licensed or non-licensed HCP via a call center.

The identity management system 610 may capture a license number or other nationally/regionally issued medical identifier to begin this process. The system may:
Capture the license number;
Capture current practice/work address of the HCP;
Use HCP-entered data to search authoritative HCP data, e.g., data in the HCP data management system 630;
If matched, HCP passes automated verification. The system may set the HCP's Account Verification Status to LICENSED; and capture the process information required for Verification History;
If the HCP fails automated verification, the system prompts HCP to contact the call center. The system may capture the process information needed for Verification History;
If the HCP is non-licensed, does not have a license number handy, or wants to verify by a call center, the system may set the HCP's Verification Status to NON-LICENSED.

When the HCP is verified by a call center, the system may display contact phone number according to the country in which the HCP is practicing. The call center may answer the call and verify the HCP using resources and procedures in the call center. If the HCP is licensed, the system may set the HCP's verification status to LICENSED.

The system may match the HCP-entered data against data in the HCP data management system 630. A match is made when the system finds an HCP meeting the following criteria:
The HCP-entered license/identifier matches an active license in the HCP data management system 630, and
The HCP-entered practice Address reasonably matches the HCP associated to the matched license.

During the verification process, the HCP user may be asked to verify his/her professional information, e.g., address, license number. The HCP user's response may be compared with the HCP data in the HCP data management system 630 to verify the HCP user. The HCP user's response may be associated with the HCP's profile information and used to update the HCP data in the HCP data management system 630.

If the HCP chooses to sign in, an authentication event may be triggered, and upon successful sign-in, identity information may be exchanged in the form of identity claims within a token with Customer.com. The HCP may register from any service provider website associated with the identity management system 610, and sign in from any service provider website associated with the identity management system 610, which could be different from the one he/she registered from. For example, the user may register from the website run by the service provider web server 640, and sign in from the website run by the service provider web server 641.

Functioning as a trusted Identity Provider (IdP), the identity management system 610 may authenticate HCPs and provide identity assertions using widely used protocols, e.g., Security Assertion Markup Language ("SAML") v2.0 and OpenID Connect 1.0. An identity assertion is in the form of a token and is used by a service provider (including third party service providers) to grant access to various services.

The process begins when the service provider website (e.g., customer.com) redirects the HCP browser to a login page URL hosted by the identity management system 610. URL query parameters indicate the type of access token returned after authentication. The login page captures the username and password, and enforces authentication protections, such as limiting the number of failed password attempts. Once the HCP is authenticated, the identity management system 610 may begin authentication token flow following a token exchange protocol, e.g., OpenID Connect 1.0 Provider or SAML 2.0 Identity Provider.

As detailed in the SAML v2.0 specification, the system requires knowledge of the service provider's public certificate file, the unique name of the service provider (Issuer ID), and a post back URL. This information is collected during registration. At a minimum, the system supports the IdP initiated single sign-on flow shown in FIG. 9.

At 901, a user (HCP) visits a service provider web portal and selects to log in using the identity management system 610 as the identity provider.

At 903, the service provider web server 640 may redirect the HCP's (user's) browser to a URL owned by the identity management system 610.

At 905, the identity management system 610 may capture credentials via the web browser.

At 907, The identity management system 610 may authenticate the HCP (user) with data in the identity data storage device 612.

At 909, the identity management system 610 may use HTTP POST (HTTP-POST Binding) to return a SAML response with a digitally signed assertion to the browser.

At 911, the browser may automatically post the HTML form to a location or URL specified by the service provider during registration.

At 913, the service provider may receive the SAML Authentication Response and grant access to services as needed.

The SAML response issued by the system may adhere to the file structure as outlined in the official OASIS SAML Specifications. In the Attribute Statement of the SAML response, the following attributes of the HCP profile may be present:
Globally Unique Identifier of the HCP,
UserName,
First Name,
Last Name,
Verification Status,
Last License Verification Timestamp,
License Number used for Verification, and Any identifiers owned by the service provider.

Figure 10:
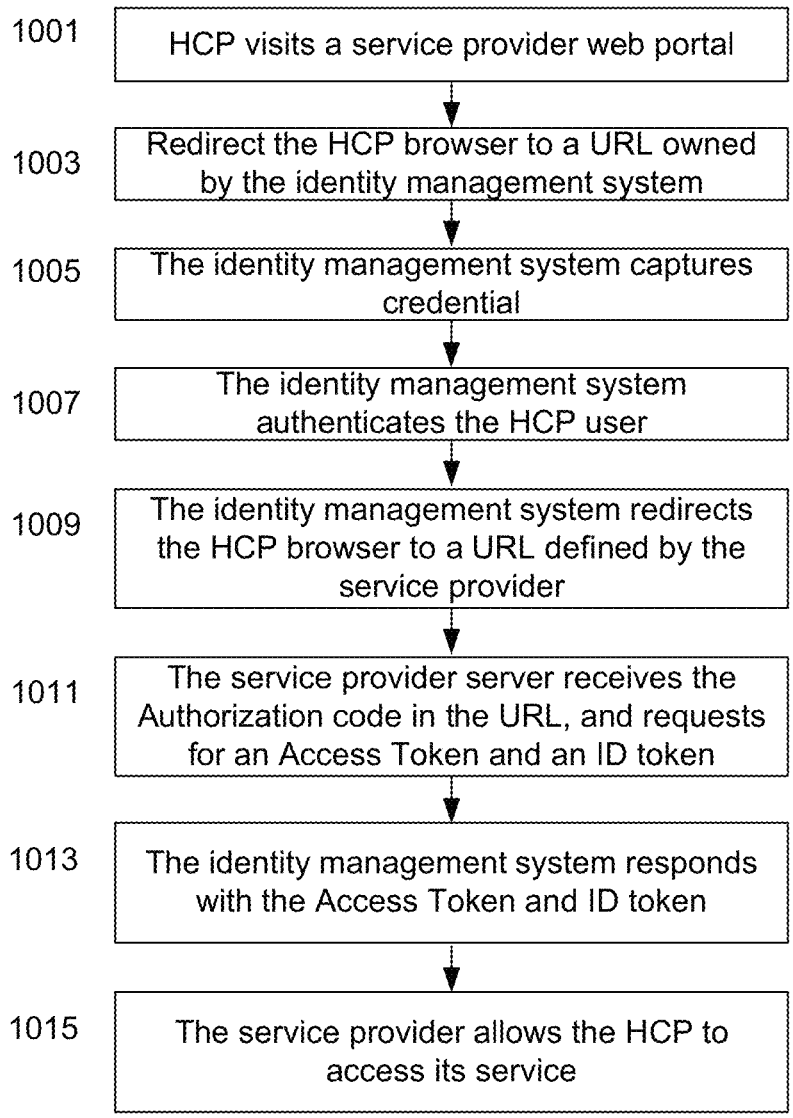
FIG. 10 illustrates an example flowchart of a method for HCP authentication according to one embodiment of the present invention.

The identity management system 610 may support the Authorization Code OpenID Connect flow. In this flow, an authorization code is generated upon successful authentication and is then exchanged by the service provider for an identity access token (in the OpenID Connect implementation, the service provider is referred to as the relying party). Other approved OpenID Connect flows may be supported in different circumstances as allowed by the OpenID Connect specification. One example flow is shown in FIG. 10 as follows:

At 1001, a user (HCP) visits the relying party's website and chooses to login with the identity management system 610 as the identity provider.

At 1003, the service provider web server 640 may redirect the HCP browser to a URL owned by the identity management system 610 passing the following parameters: client ID obtained during client registration, response type set to 'code', scope of 'openid email', and redirect URL endpoint hosted by the relying party that will receive the response from the system 610 specified during registration.

At 1005, the identity management system 610 may capture HCP credentials via the web browser.

At 1007, the identity management system 610 may authenticate the HCP.

At 1009, the identity management system 610 may redirect the HCP browser to the URL defined during relying party registration. The URL may contain an authorization code in the form of a URL parameter.

At 1011, the relying party, or the service provider web server 640, may receive the authorization code and, using its client ID and secret, exchanges the authorization code for an access token and an ID token. This is a POST request which must contain the following parameters: authorization code, Client ID obtained during client registration, client secret obtained during client registration, redirect URL endpoint hosted by the relying party that will receive the response from the system specified during registration, and grant type specified as 'authorization code'.

At 1013, the identity management system 610 may respond with the following: an access token that can be sent to the system's API, an ID token that contains identity information about the user which is digitally signed by the system using JSON Web Signature ("MS") and adheres to the OpenID Connect token standard, and the remaining lifetime for the access token.

At 1015, the service provider web server 640 may receive the response and grant access to services as needed.

The present invention provides a globally unique identifier (GUID) which is a unique ID for the HCP's identity. This is system generated and returned in authentication API calls. Each HCP identity has one and only one GUID.

Primary keys and other external identifiers for HCPs in CRM (Customer Relationship Management) systems may be associated to the HCP's identity.

The identity management system 610 may offer a mechanism for resolving a primary CRM key using user-entered data from the identity data storage device 612. This mechanism is available to any CRM system integrated into the identity management system 610.

Primary keys or other external keys retrieved from integrated CRM systems are private. Every identifier from CRM that is stored in the identity data storage device 612 may carry the CRM system ID from which it came. Service providers using system's authentication API are associated to the specific CRM systems that they are allowed to access. When the authentication API is called, the system will check the CRM system ID of all the identifiers tied to the identity and only return those that the service provider is allowed to access.

The identity management system 610 may implement an Authoritative Data Source (ADS) and offer data from an Authoritative Source. Authoritative Data Source may be an information technology system designed to ensure the veracity of authoritative data, e.g., the HCP data management system 630. Authoritative Source(s) may be a legally recognized entity that produces/manages/develops the data asset itself. Authoritative Data may be the net result of sourcing, storing and managing electronic data, and the actual data produced by the authoritative source and managed by the ADS.

HCP Profile attributes, License, National/Regional Identifier, and address data are available from an authoritative source. Changes in demographic data, profile data, license, or other identifier data may be validated and updated on an ongoing basis. Records and details requiring suppression may be accounted for. Anomalies may occur among data sources, and data validity may be maintained by the comparison of data elements across multiple, authoritative sources. Administrators of the data source may research, remedy, and resolve any data discrepancies. Data records may be routinely compared against public records and other authoritative sources to ensure all information is complete and accurate.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for managing online identity in an identity management system, the method comprising:
    enabling display of a user registration page on a first website in response to a request from the first website, wherein the first website is controlled by a first server, and is associated with the identity management system;
    receiving identity registration information of a first user, wherein the identity registration information is for creating an identity for the first user in the identity management system;
    creating a first identity record in the identity management system for the first user;
    receiving identity verification information of the first user, wherein the identity verification information indicating if the first user is licensed in a geographic region;
    comparing the identity verification information of the first user with data in a master data management system;
    determining that there is a match in the master data management system for the identity verification information of the first user;
    verifying that the first user is licensed in the geographic region;
    receiving a first query; and
    obtaining a first data record in response to the first query.

2. The method of claim 1, wherein the identity verification information comprises medical license information.

3. The method of claim 1, wherein the identity verification information comprises an address.

4. The method of claim 1, further comprising: marking the identity record of the first user in the identity management system to indicate that the first user is medically licensed.

5. The method of claim 1, wherein the master data management system stores the first user's business address.

6. The method of claim 1, wherein the master data management system stores physician specialty information.

7. The method of claim 1, wherein the master data management system stores health care organization information.

8. The method of claim 1, wherein the master data management system stores de-duplicated data from at least two sources.

9. The method of claim 1, wherein the master data management system stores verified health care provider ("HCP") data.

10. The method of claim 1, wherein the identity registration information comprises the first user's email address and login credentials.

11. The method of claim 1, further comprising:
    receiving a login request from the first user from a second website run by a second service provider web server; and
    authenticating the first user with data in the identity management system.

12. The method of claim 11, wherein the identity management system and the second service provider web server communicate via a Security Assertion Markup Language ("SAML") protocol when authenticating the first user.

13. The method of claim 12, further comprising: redirecting the second website to a first URL designated by the identity management system.

14. The method of claim 12, further comprising: sending a first authentication result from the identity management system to the second website.

15. The method of claim 11, wherein the identity management system and the second service provider web server communicate via an OpenID Connect protocol when authenticating the first user.

16. The method of claim 15, further comprising: redirecting the first user's browser to a second URL, and wherein the second URL comprises an authentication code.

17. The method of claim 15, further comprising: sending an access token by the identity management system corresponding to the authentication code.

18. The method of claim 1, further comprising: associating a primary key in a Customer Relationship Management system ("CRM") with the identity record.

19. The method of claim 18, further comprising: resolving the primary key with data from the identity management system.

20. An identity management system, comprising:
an identity data storage device for storing identity data; and
an identity management server for:
  enabling display of a user registration page on a first website in response to a request from the first website, wherein the first website is controlled by a first server, and is associated with the identity management system;
  receiving identity registration information of the first user, wherein the identity registration information is for creating an identity for the first user in the identity management system;
  creating a first identity for the first user;
  storing the first identity as a first identity record in the identity data storage device;
  receiving identity verification information of the first user, wherein the identity verification information indicating if the first user is licensed in a geographic region;
  comparing the identity verification information of the first user with data in a master data management system;
  determining that there is a match in the master data management system for the identity verification information of the first user;
  verifying that the first user is licensed in the geographic region; and
  authenticating the first user with data in the identity data storage device.

* * * * *